US009255811B2

(12) United States Patent
Edelen (10) Patent No.: US 9,255,811 B2
(45) Date of Patent: Feb. 9, 2016

(54) VISUAL GUIDANCE SYSTEM

(71) Applicant: Brian R. Edelen, Brooklyn, IA (US)

(72) Inventor: Brian R. Edelen, Brooklyn, IA (US)

(*) Notice: Subject to any disclaimer, the term of this patent is extended or adjusted under 35 U.S.C. 154(b) by 0 days.

(21) Appl. No.: 14/608,446

(22) Filed: Jan. 29, 2015

(65) Prior Publication Data

US 2015/0211876 A1      Jul. 30, 2015

Related U.S. Application Data

(60) Provisional application No. 61/932,882, filed on Jan. 29, 2014.

(51) Int. Cl.
*G06F 7/00*      (2006.01)
*G01C 21/36*      (2006.01)

(52) U.S. Cl.
CPC .................................. *G01C 21/36* (2013.01)

(58) Field of Classification Search
None
See application file for complete search history.

(56) References Cited

U.S. PATENT DOCUMENTS

| 2004/0066376 A1* | 4/2004 | Donath | B60R 1/00 345/169 |
| 2005/0149251 A1* | 7/2005 | Donath | G01C 21/26 701/532 |

OTHER PUBLICATIONS

EOTech, http://en.wikipedia.org/wiki/EOTech, Jan. 28, 2014, pp. 1-3, Wikipedia.
L-3 EOTech: Holographic Weapons Systems, http://www.eotech-inc.com/holo_howto.php, Jan. 28, 2014, 1 page.

* cited by examiner

*Primary Examiner* — Adam Alharbi
(74) *Attorney, Agent, or Firm* — Christopher A. Proskey (57) ABSTRACT

A visual guidance system is presented. The system includes a vehicle with an implement connected thereto. The vehicle has a windshield through which the operator looks while steering the vehicle. A guidance image is displayed in the operator's sight path and provides a point of reference for the operator that indicates the outer most position of the implement. The position of this guidance image is calculated by a control system and the image is displayed by a display unit. As the operator steers the vehicle, the operator positions the guidance image at the border of the field or road. This allows the user to precisely control the vehicle and the implement in a convenient and efficient manner.

20 Claims, 9 Drawing Sheets

VISUAL GUIDANCE SYSTEM

CROSS REFERENCE TO RELATED APPLICATION

This application claims the benefit of U.S. Provisional Application No. 61/932,882 filed Jan. 29, 2014.

FIELD OF THE INVENTION

This invention relates to a visual guidance system. More specifically, and without limitation, this invention relates to a visual guidance system for vehicles with implements.

BACKGROUND OF INVENTION

Implements are often pushed in front of or pulled behind various vehicles in various industries for various reasons. Countless examples of just such an arrangement exist within the agricultural industry and include a tractor pulling a planter, cultivator, sprayer, spreader or similar device. Countless other examples exist within the construction, earth moving and maintenance industries such as a snow plow, bulldozer, grater, paver or similar device which pushes or pulls various blades or other implements to move or remove material. Other examples exist wherein the attached implement is a trailer or other object or device connected to the vehicle that has wide berth that provides similar problems to those related to vehicles with other implements. Examples of these vehicles include airplanes with their wide wings, large boats or barges, and specialty vehicles such as wide construction equipment, large mining equipment, oversized hauling equipment, and the like. Throughout this disclosure, the term vehicle shall be used to describe any type of vehicles without limitation; and the term implement shall be used to describe any type of implement or attachment connected to these vehicles that must be accounted for when steering the vehicle.

To improve efficiency, over time the size of vehicles has grown as has the width of implements. As an example, to plant more seeds in a single pass, the width of planters has grown from 6 rows, to 12 rows, to 24 rows to now even 48 rows. To till more ground in a single pass, the width of tillage devices has similarly grown. To spray more ground, the width of sprayers has similarly grown. To carry more passengers and cargo, the width of airplanes wings has similarly grown. To plow or grate a larger area, snow plows, graters and snow blowers have grown in width.

While this increased width provides the advantage of covering more ground in a single pass, wider implements have their disadvantages. Namely, as the width of vehicles and/or implements have grown, it has become more difficult for operators to control these vehicles and implements. This is because the operators have difficulty predicting where the outside edges of the implements will be. This is especially true when the vehicles have to follow borders of a field or road within close tolerances. If the operator misjudges where the outside edge of the implement will travel this can cause the implement to strike buildings, fences, terraces, rocks, utility poles, irrigation equipment or the like. Or alternatively, miscalculation can cause the operator to not cover ground, leaving piles of snow or untilled or unplanted ground, which can cause safety hazards or loss of profits. Further safety hazards exist when traveling on roads used by pedestrians and other vehicles as a miscalculation can cause injury or an accident.

Therefore a need exists in the art to provide a visual guidance system that addresses these problems.

Thus it is a primary object of the invention to provide a visual guidance system that improves upon the state of the art.

Another object of the invention is to provide a visual guidance system that helps provide the operator with a point of reference to help guide the vehicle and implement.

Yet another object of the invention is to provide a visual guidance system that is easy to use.

Another object of the invention is to provide a visual guidance system that can serve as a back-up or double check to GPS guidance systems.

Yet another object of the invention is to provide a visual guidance system that does not require GPS.

Another object of the invention is to provide a visual guidance system that predicts the position of an outside edge of an implement in the direction of travel thereby providing a reference point for steering.

Yet another object of the invention is to provide a visual guidance system that is reliable.

Another object of the invention is to provide a visual guidance system that is inexpensive.

Yet another object of the invention is to provide a visual guidance system that is adjustable.

Another object of the invention is to provide a visual guidance system that adjusts for the position of an operator's head.

Yet another object of the invention is to provide a visual guidance system that is robust.

Another object of the invention is to provide a visual guidance system that can be easily seen.

Yet another object of the invention is to provide a visual guidance system that is simple and does not distract the operator.

Another object of the invention is to provide a visual guidance system that can be adjusted for various implements and applications.

Yet another object of the invention is to provide a visual guidance system that is robust and durable.

Another object of the invention is to provide a visual guidance system that can be used in a wide variety of applications.

Yet another object of the invention is to provide a visual guidance system that reduces collisions with the implement.

Another object of the invention is to provide a visual guidance system that reduces overlap between passes.

Yet another object of the invention is to provide a visual guidance system that maximizes the amount of ground covered.

Another object of the invention is to provide a visual guidance system that improves operator efficiency.

Yet another object of the invention is to provide a visual guidance system that reduces strain on an operator.

Another object of the invention is to provide a visual guidance system that makes the vehicle easier to control.

Yet another object of the invention is to provide a visual guidance system that improves safety.

Another object of the invention is to provide a visual guidance system that adjusts for the orientation of an operator's head or more specifically for the orientation of the operator's eyes.

These and other objects, features, or advantages of the present invention will become apparent from the specification, drawings and claims.

SUMMARY OF THE INVENTION

A visual guidance system is presented. The system includes a vehicle with an implement connected thereto. The vehicle has a windshield through which the operator looks while steering the vehicle. A guidance image is displayed in the operator's sight path and provides a point of reference for the operator that indicates the outer most position of the implement. The position of this guidance image is calculated by a control system and the image is displayed by a display unit. As the operator steers the vehicle, the operator positions the guidance image at the border of the field or road. This allows the user to precisely control the vehicle and the implement in a convenient and efficient manner.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that mechanical, procedural, and other changes may be made without departing from the spirit and scope of the present inventions. The following detailed description is, therefore, not to be taken in a limiting sense, and the scope of the present invention is defined only by the appended claims, along with the full scope of equivalents to which such claims are entitled.

As used herein, the terminology such as vertical, horizontal, top, bottom, front, back, end, sides, outer, inner and the like are referenced according to the views presented. It should be understood, however, that the terms are used only for purposes of description, and are not intended to be used as limitations. Accordingly, orientation of an object or a combination of objects may change without departing from the scope of the invention.

Figure 1:
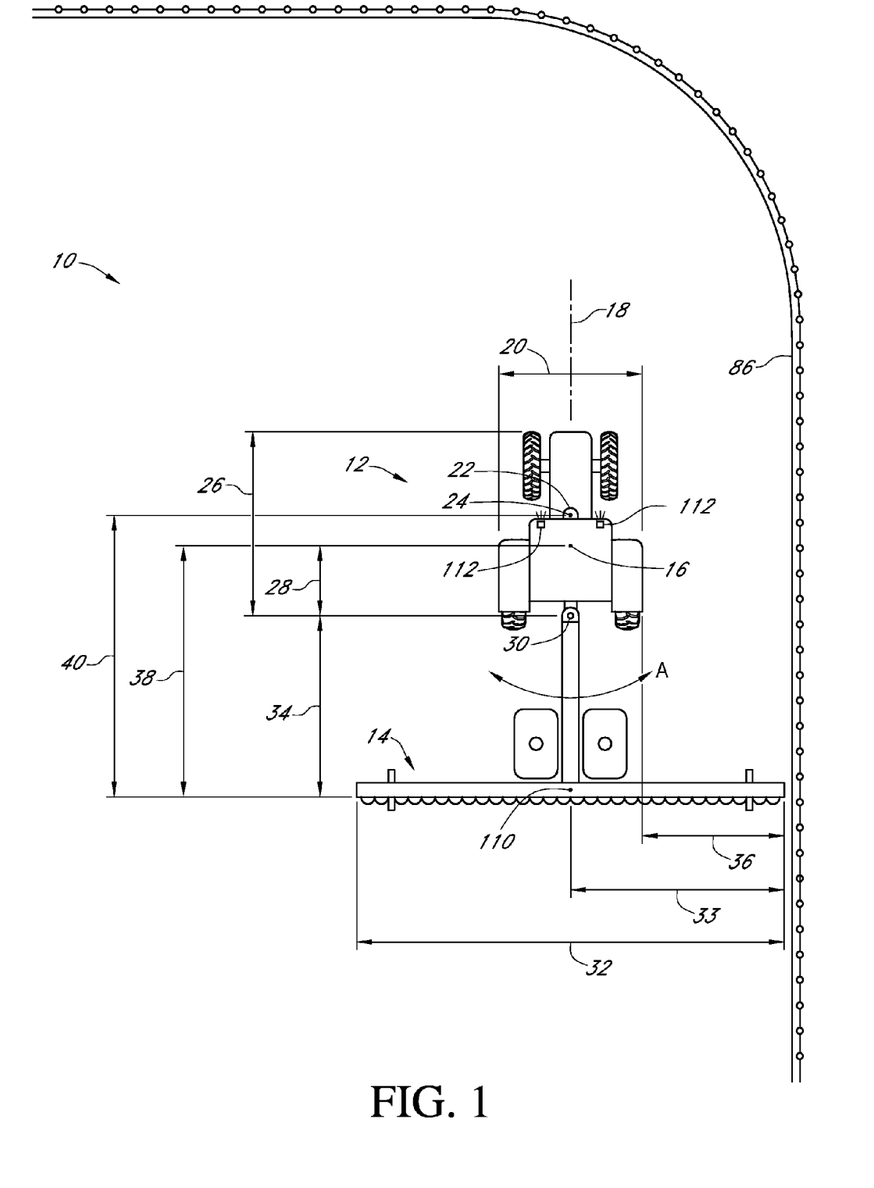
FIG. 1 is a plan view of the system including a vehicle and an implement in a field having a border.

As used herein, the invention is shown and described as being used in association with a tractor pulling an implement which is depicted as a planter. However the invention is not so limiting. Instead, one of ordinary skill in the art will appreciate that the system and method presented herein can be applied to any vehicle and any implement, without limitation. The system and method is merely shown and described as being used in association with a tractor as a vehicle and a planter as an implement for ease of description and as one of countless examples. As such, the term implement is not meant to be limiting and includes any attachment to a vehicle or any device that extends outward, below, in front of, behind or any combination thereof With reference to the figures, a visual guidance system 10 is presented. The system 10 includes a vehicle 12 with an attached implement 14. In the arrangement shown, as one example, vehicle 12 is a tractor and implement 14 is a planter pulled behind the tractor. In alternative arrangements, the vehicle 12 is a truck and implement 14 is a blade or plow connected in front of, behind, beneath and/or to the side of the vehicle 12 or any combination thereof. In yet another alternative arrangement, vehicle 12 is an airplane, and implement 14 is the wings of the plane.

Figure 2:
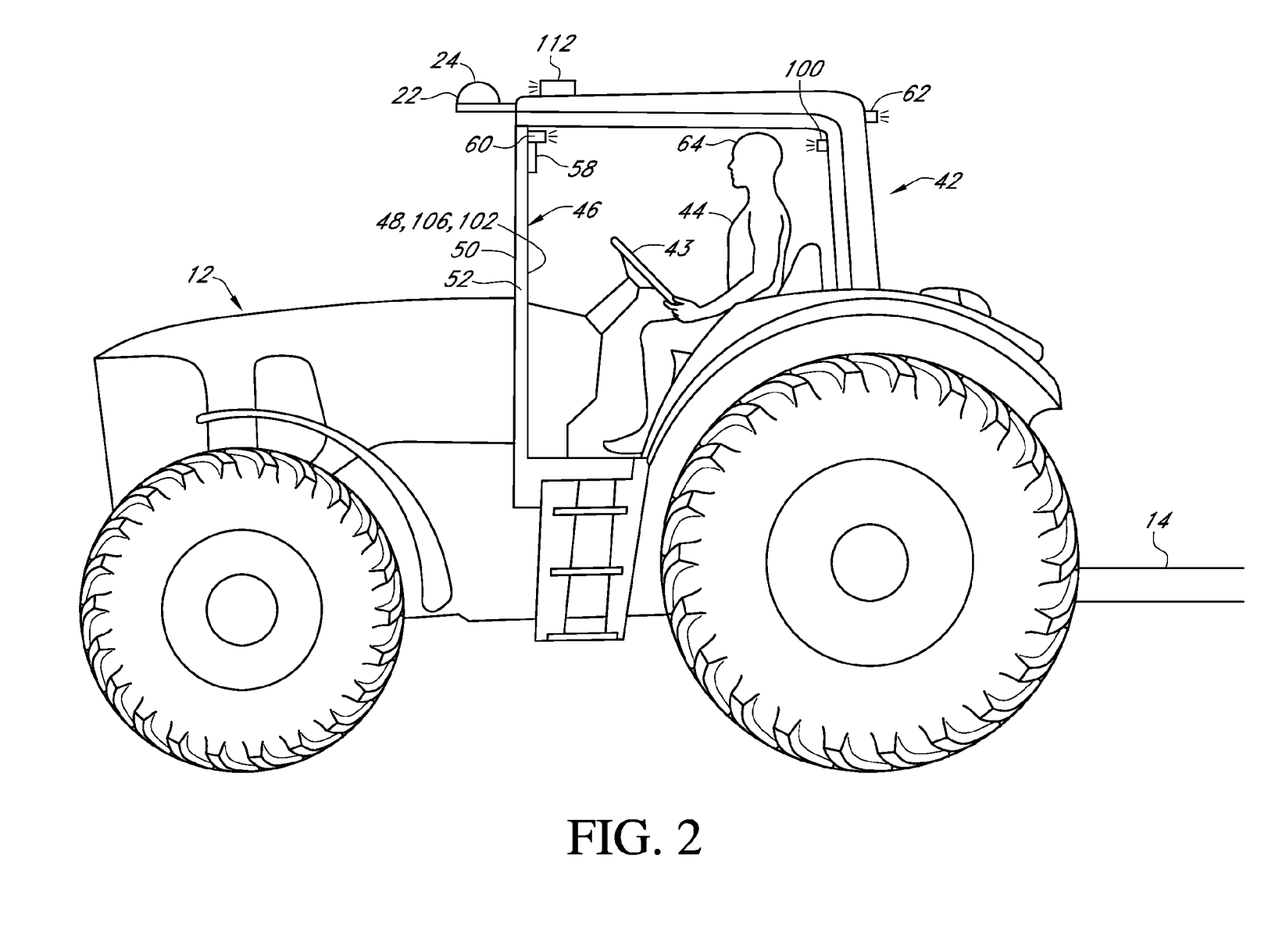
FIG. 2 is an elevation view of a vehicle having a windshield, operator, rear display and GPS receiver.

Vehicle 12 has a center point 16 which is the approximate center of the vehicle 12. Vehicle 12 has a centerline 18 which is the approximate center, centerline or center plane of the vehicle extending from front-to-back. Vehicle 12 has a vehicle width 20 which is the approximate side-to-side width of the vehicle 12. Vehicle 12 has a GPS receiver 22 connected thereto at a GPS center point 24 position, which serves as the center point where GPS signals are received. Vehicle 12 also has a vehicle length 26, which is the front-to-back length of vehicle 12. Vehicle 12 also has a center point offset 28, which is the distance from the center point 16 to the attachment point 30, which is the location at which implement 14 connects to vehicle 12.

Implement 14 connects to vehicle 12 at attachment point 30. Implement 14 articulates upon attachment point 30. That is, implement 14 swings left or right, or moves up or down, or moves forward or backward, upon attachment point 30 as vehicle 12 is steered (this is shown by arrow A). In the arrangement shown, implement 14 is centrally aligned with the vehicle 12 and therefore implement 14 shares the centerline 18 with vehicle 12, however this is not always the case. Implement 14 has an implement width 32 which is the approximate side-to-side width of the implement 14 (and a half implement width 33, which is the distance from the centerline 18 to the outside edge of the implement 14). Implement 14 also has an implement length 34, which is the front-to-back length of implement 14.

As can be seen in the figures, the size and shape of vehicle 12 and implement 14 are substantially different. These differences in size and shape create substantial complexities and difficulties when trying to precisely control the position of implement 14. To control the implement 14, the various parameters are determined or calculated. One parameter includes the width difference 36 between the vehicle width 20 and the implement width 32. Another parameter includes the distance 38, which is the distance from the center point 16 to the rear of the implement 14. Another parameter includes the distance 40, which is the distance from the GPS center point to the rear of the implement 14. Any other number of distances or dimensions can be calculated so as to predict the positioning of the implement 14 under operating conditions. These distances are calculated from a reference point, such as the GPS center point 24 or the center point 16 (which are often used in the industry) however any other position will suffice for calculating other lengths and distances therefrom.

The vehicle 12 includes a cab 42 having an open interior which houses operator 44. Cab 42 includes drive controls 43 which include all the conventional control equipment for controlling vehicle 12, such as the steering wheel, throttle, brakes, etc. Cab 42 includes a windshield 46 positioned in front of the operator and in the operator's sight path when the operator 44 looks forward. The operator 44 looks through the windshield 46 when steering the vehicle 12. Conventionally, windshield 46 is a single pane of glass. In this application it may be necessary that windshield include an interior layer 48 and an exterior layer 50, separated by an interior space 52 with other components positioned therein, as will be more fully described herein.

Figure 6:
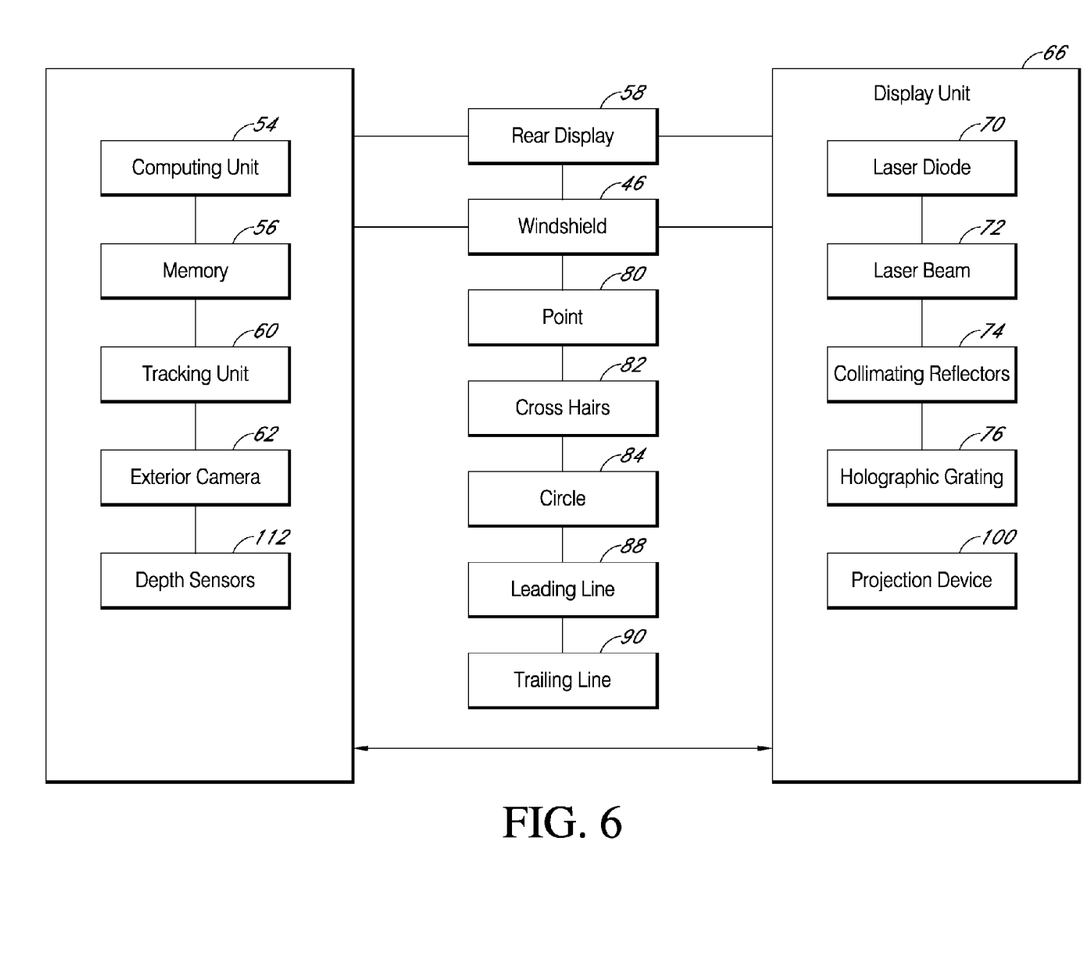
FIG. 6 is a plan view of the electronic components of the system.

Also connected to the system 10 is a computing unit 54 having memory 56, a rear display 58, a tracking unit 60 and an exterior camera 62. Computing unit 54 is any form of an electronic device which processes information and provides results or outputs. In this particular arrangement, computing unit 54 is any form of a processor, chip, computer, computing device or the like. Connected to computing unit 54, as a standalone unit, or as an incorporated unit is memory 56. Memory 56 is any form of a memory or storage device such as flash, ram, a hard drive, a disk or the like, that stores and retrieves information and instructions. Rear display 58 is connected to computing unit 54 and memory 56. Rear display 58 is any form of a display device such as a flat screen TV, a plasma TV, an LCD screen, a touch-screen device, or any other image projecting device or image displaying device. In the arrangement shown, the rear display 58 is conveniently placed at the upper-center of the windshield 46, in the approximate location wherein a rear-view-mirror is located, or is formed as part of the rear-view-mirror, however, any other location is hereby contemplated for use.

Tracking unit 60 is any form of a sensor such as a camera, a laser sensor, infrared sensor, position sensor, an image sensor, a movement sensor, or the like. Tracking unit 60 senses or reads the location of the operator 44, or more specifically the location of the operator's head 64, and even more specifically the operator's eyes. From this information, the system 10 determines a position factor, which is the position of the operator 44, the position of the operator's head and/or the position of the operator's eyes, and an orientation factor, which is the orientation of the operator, the orientation of the operator's head and/or the orientation of the operator's eyes, with the orientation being the direction, angle or position where the operator is facing or looking.

Exterior camera 62 is connected to computing unit 54 and is any form of a camera, video camera, image generating device or the like. In the arrangement shown exterior camera 62 is connected to the rear of cab 42 and projects rearward. However, any other location of exterior camera 62 is hereby contemplated for use, such as positioning exterior camera 62 on the rear of implement 14 on the rear of wagons, on the tail of a plane, or the like. Alternatively, additional cameras 62 may be facing forward or any other direction.

Figure 3:
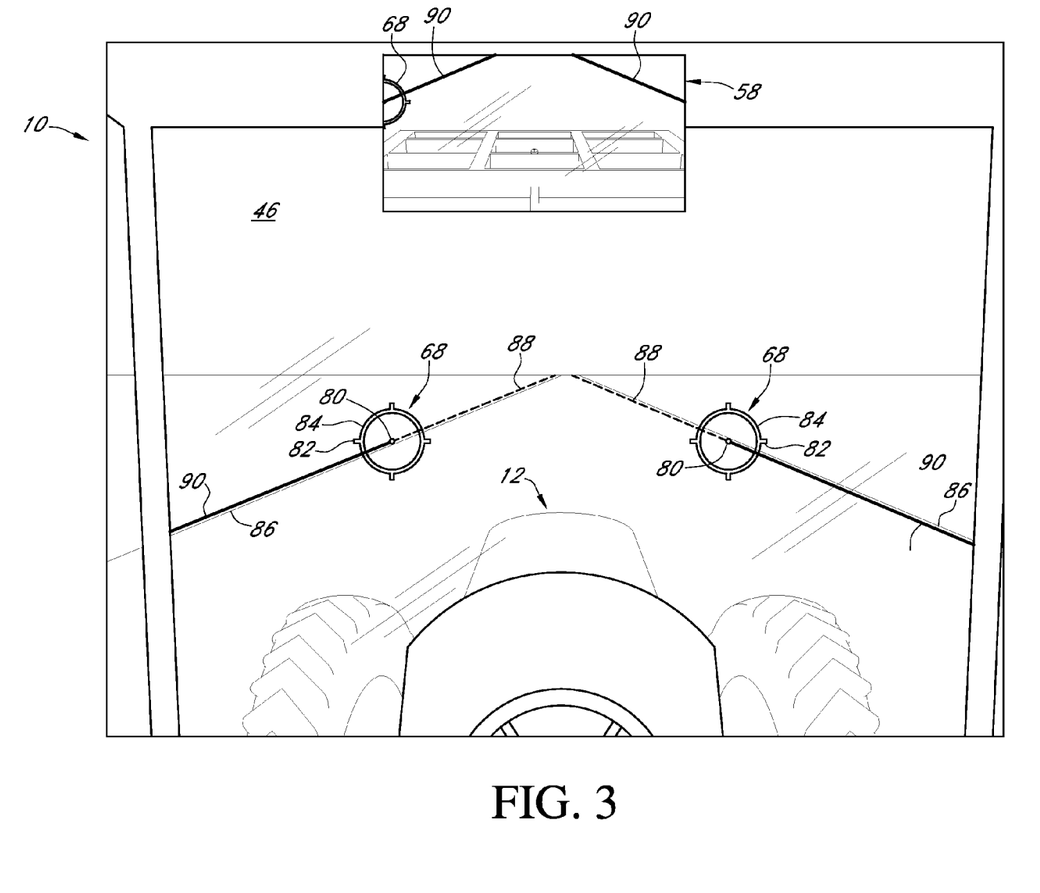
FIG. 3 is a is an elevation view from the operator's perspective through the windshield of the vehicle, the view showing the image including the leading line and the trailing line, as well as the rear display also showing the trailing line.

The system 10 also includes a display unit 66. Display unit 66 is used to display or project a guidance image 68 in the operator's forward sight path or line of sight, such as on or in the windshield 46. This guidance image 68 is then used by the operator 44 to guide the vehicle 12 and implement 14. The guidance image 68 can be a reflected image, a holographic image or any other image.

As one example, when guidance image 68 is a holographic image, a system similar to that developed by EOTech, L-3 Communications EOTech, Inc. of Ann Arbor, Mich., U.S. is used. The EOTech system is an achromatic holographic optic that compensates for any change in the emission wavelength of the laser diode with temperature. The EOTech system uses a representative reticle recorded in three-dimensional space onto holographic film that is part of the optical viewing window. Like the reflector sight, the holographic sight's reticle uses collimated light and therefore has an aim-point that can move with eye position. This is compensated for by having a holographic image that is set at a finite distance, in one case around 100 yards. The sight's parallax due to eye movement is the size of the optical window at close range and diminishes to zero at the set distance. When a laser is used as the light source, the aiming reticle can be an infinitely small dot whose perceived size is given by the acuity of the eye. For someone with 20/20 vision, it is about 1 MoA. To compensate for any change in the laser wavelength, the EOTech sight employs a holography grating that disperses the laser light by an equal amount but in the opposite direction as the hologram forming the aiming reticle. The result is a reticle that is stable with the change in temperature.

Figure 5:
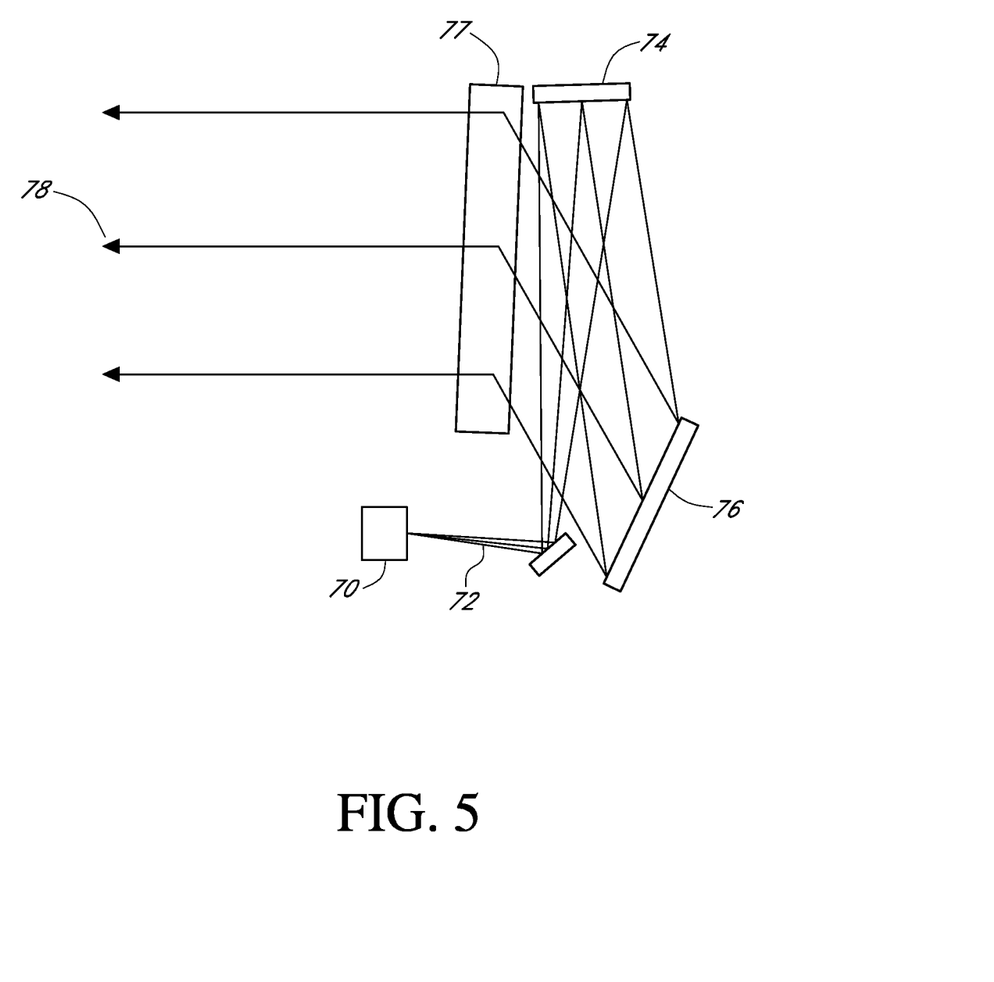
FIG. 5 is an elevation view of the components of the display unit.

While EOTech applied its development to weapons sights, similar technology is applied to providing image on or in windshield 46. This system includes a laser diode 70 which projects laser beams 72 onto collimating reflectors 74 and holographic grating 76. These laser beams 72 are then projected through reticle image hologram 77 to the operator's eye thereby forming a holographic image.

In operation, the operator enters the vehicle parameters and implement parameters of the system 10 into control system 53. That is, the center point 16, the vehicle width 20, the GPS center point 24, the vehicle length 26, the center point offset 28, the location of the attachment point 30, the implement width 32, the implement length 34, and any other necessary parameter to predict the location of the outside edges of the implement 14 under any steering conditions.

Figure 4:
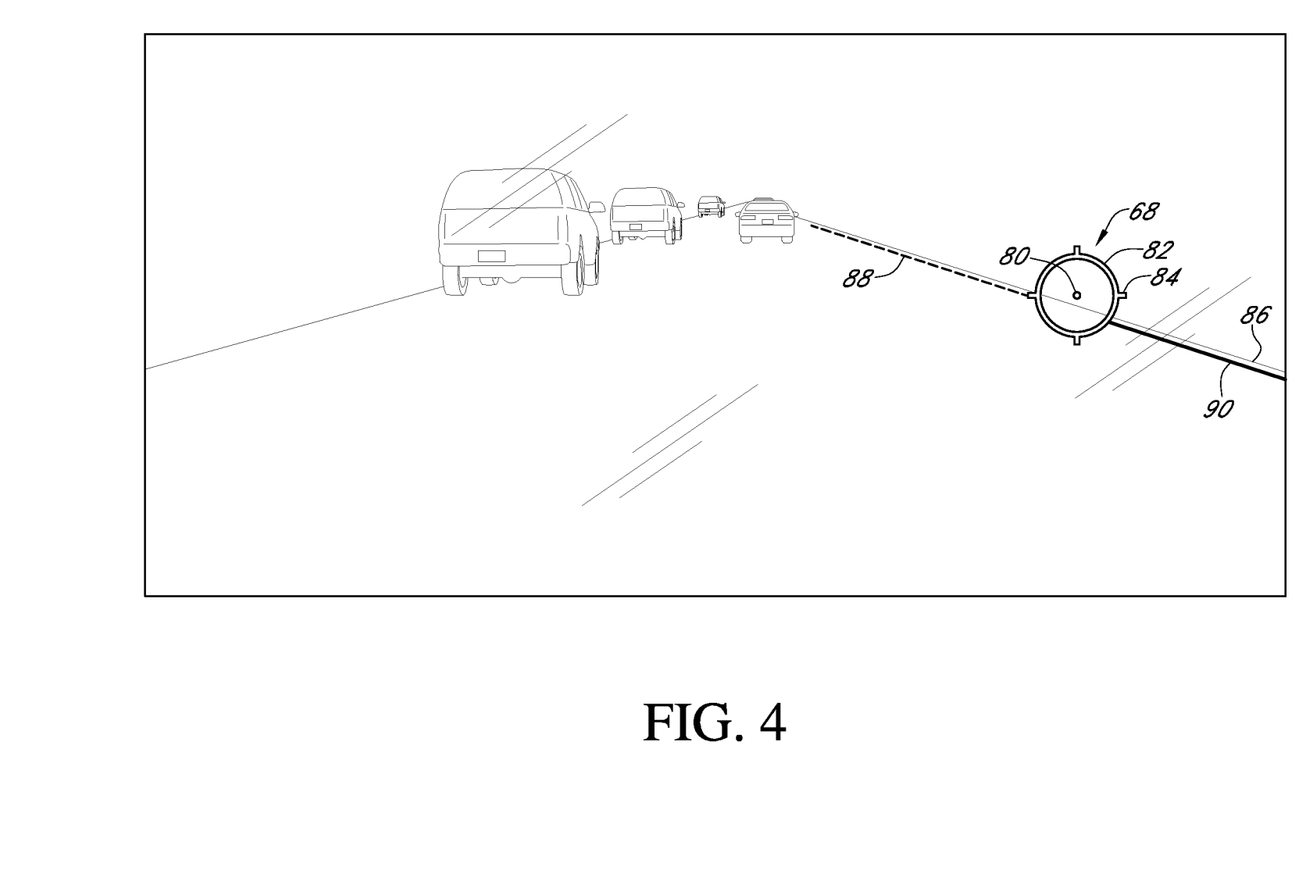
FIG. 4 is a similar view to FIG. 3 showing an elevation view from the operator's perspective through the windshield of the vehicle, the view showing the image including the leading line and the trailing line.

The computing unit 54 then calculates the approximate location of the outside edge of implement 14 based on these parameters through the application of instructions, or software, stored in memory 56. Based on these calculations, computing unit 54 instructs display unit 66 to project guidance image 68 on the windshield 46. This guidance image 68 is any form of an image, such as a point or dot 80, cross-hairs 82, a circle 84, a dot within a circle, cross hairs within a circle, or any combination thereof, as is shown in the figures. The center of this guidance image 68 serves as a guiding point for the outside edge, or center, or any other desired part of the implement 14 or combination thereof at any given point in time. That is, based on the known vehicle parameters and implement parameters of the system 10, computing unit 54 calculates the approximate future position of the outside edge of the implement 14 and display unit 66 projects guidance image 68 on windshield 46 for the operator 44 to passively view while operating the vehicle 12. In making its calculations, computing unit 54 takes into account the direction, speed, amount of turn or tilt, or any other variable the vehicle 12 is currently experiencing. Taking these variables into account, computing unit 54 adjusts the position of guidance image 68 accordingly. To precisely control the vehicle 12 as well as the implement 14, the user merely steers so as to place the guidance image 68 at the border 86. Border 86 is the boundary of a field, or the side of the road, or the edge of the last pass across the field or any other spot or position that the operator 44 wants the outside of the implement 14 to pass by or over.

To further enhance control of the system 10, the computing unit 54 projects a leading line 88 and a trailing line 90. Leading line 88 is the currently calculated position of the guidance image 68 forward from the point or dot 80, cross-hairs 82 or circle 84 so as to show the projected position of guidance image 68 in the near future. Leading line 88 helps the operator 44 to predict where guidance image 68 will be in the near future as well as help the operator 44 precisely control vehicle 12.

Trailing line 90 is the calculated position of the guidance image 68 rearward from the point or dot 80, cross-hairs 82 or circle 84 so as to show the recently projected position of guidance image 68. Trailing line 90 represents the location of where image 68 recently was. Trailing line 90 helps the operator to understand where the system 10 was recently steered so as to improve steering in the future. The operator's goal is to steer such that the dot 80, cross-hairs 82 or circle 84 is to travel over the border or leading line 88 for best accuracy.

As the system 10 is operating, an image of what is immediately behind the vehicle 12 and implement 14 is broadcast, shown or displayed on rear display 58, which is conveniently located in the center-upper portion of the windshield 46. This convenient location allows the operator 44 to view what is immediately behind them without having to strain their neck by turning around. In addition, control system 53 calculates the location of trailing line 90 and displays the location of this trailing line 90 on rear display 58. This overlaying of the trailing line 90 helps the operator understand how well or poorly they have recently done steering the system 10 and actually shows the trailing line 90 over the area where the implement 14 has recently been, which provides feedback to the operator 44 as to the accuracy or inaccuracy of the system 10.

In one arrangement, the display unit 66 projects guidance image 68 in position wherein the average operator 44 would view the guidance image 68. That is, the display unit 66 estimates the operators head 64 is always in the same, average or standard, location and does not take account of the orientation of the operators head 64 or where they are looking.

In an alternative arrangement, computing unit 54 is connected to a tracking unit 60 that continually monitors the operator's position, or more specifically the position of the operator's head 64, or more specifically yet the position of the operator's eyes. Based on this information, or this sensed position factor the computing unit 54 appropriately calculates and adjusts the location of the guidance image 68 for the specific and temporary position of the operator 44, the operator's head 64 and/or the operator's eyes. As the tracking unit 60 senses the movement of the operator 44, the computing unit 54 adjusts the position of the guidance image 68. In this way, better accuracy and comfort is presented to the operator 44.

In yet another alternative arrangement, tracking unit 60 that continually monitors the operator's orientation, or more specifically the orientation of the operator's head 64, or more specifically yet the orientation of the operator's eyes. This orientation is the direction or angle the operator 44 is faced, or the direction or angle the operator 44 is looking. Based on this information, or this sensed orientation factor the computing unit 54 appropriately calculates and adjusts the location of the guidance image 68 for the specific and temporary orientation of the operator 44, the operator's head 64 and/or the operator's eyes. As the tracking unit 60 senses the change in orientation of the operator 44, the computing unit 54 adjusts the position of the guidance image 68. In this way, better accuracy and comfort is presented to the operator 44.

In one arrangement, the image is not tied in with GPS and therefore, the image can be used as a double-check or back-up to GPS calculated location information. In another arrangement, GPS coordinates, as well as the variables such as speed, direction and the like are received by control system 53 from GPS receiver 22. Computing unit 54 then calculates the location of image 68 based on this GPS information. Tying the GPS receiver 22 into the computing unit 54 has the added benefit of providing mapping information to the computing unit 54. That is, the computing unit 54 is provided with the boundary 86 of the fields or roads that are pre-programmed into the system 10, as well as other information such as contour of the land, elevation, obstacles such as rocks, telephone poles, etc. Computing unit 54 can take this information into account when calculating the position of guidance image 68. This allows for greater accuracy and control of image 68 and allows for greater prediction of the leading line 88 into the future, as well as trailing line 90, especially at the point of turns, obstacles and the like.

In addition, by tying in GPS information to the computing unit 54, this allows the display unit 66 to display information provided by the GPS such as field boundaries, the edges of roads or curbs, telephone poles, rocks, or other obstacles. The projection of these obstacles on display unit 66 is certainly helpful to the operator 44 in low light conditions, during fog, at night, when harvesting tall crops that obscure obstacles, when plowing deep snow, or in any other condition that obstructs the operator's vision. In addition, by tying in GPS information allows computing unit 54 to track and display other information, such as the boundaries of previous passes across a field. As such, displaying obstacles and other information provides for more accurate control of vehicle 12 and safer operation of vehicle 12.

Figure 7:
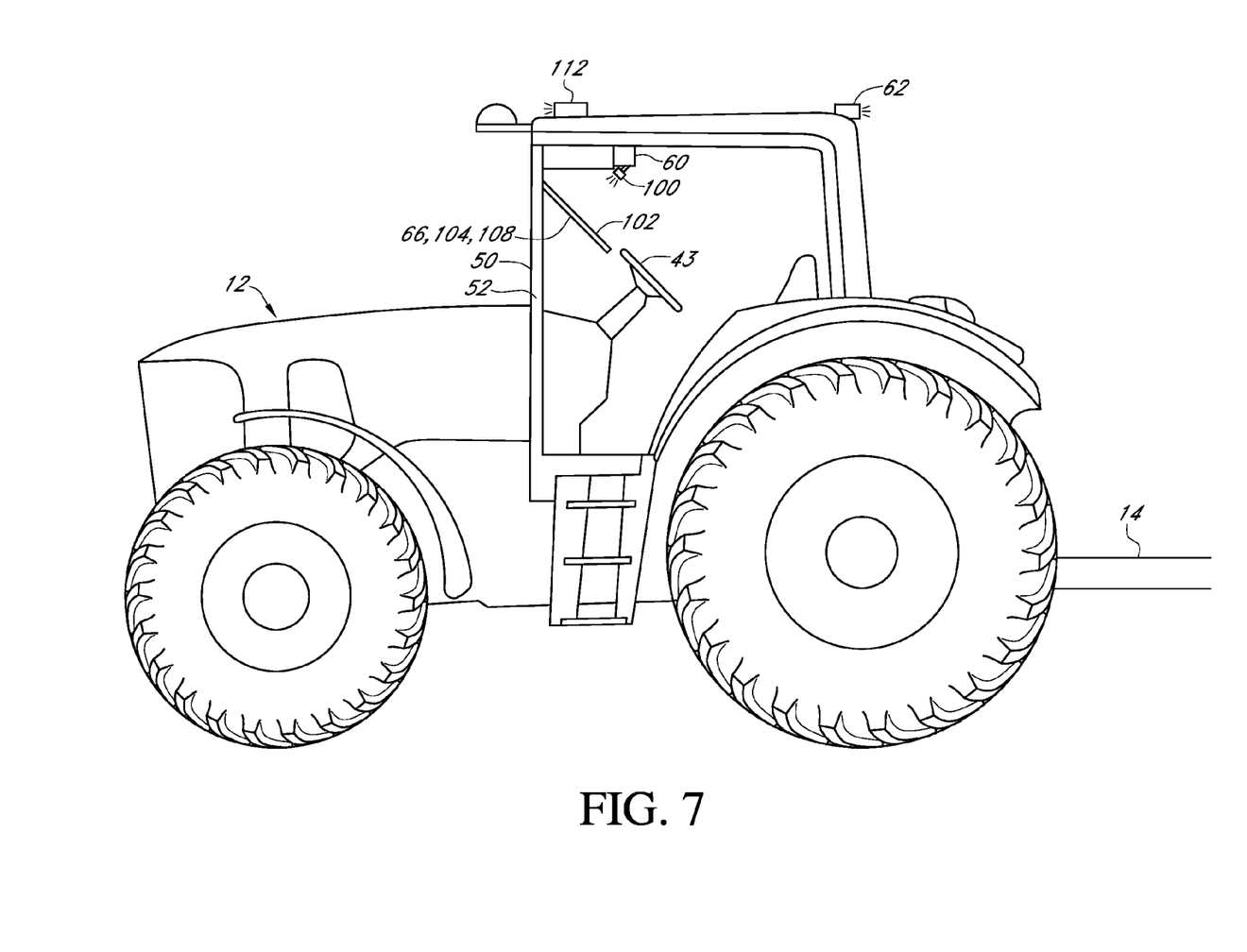
FIG. 7 is an elevation view of a vehicle having a projection device and a reflection device positioned within the cab of the vehicle.

Further Information & Alternative Arrangements:

Display Unit:

As described herein, display unit 66 is any device which displays information and/or guidance image 68. In one arrangement, display unit 66 is formed of one or more projection devices 100 (such as laser diode 70) that project information and/or guidance image 68 toward windshield 46. In one arrangement, a single projection device 100 is used that projects light, laser light, images or any other information toward windshield 46. In this arrangement, the projection device is generally centrally positioned with respect to the cab 42. In an alternative arrangement a pair of projection devices 100 are used, with one positioned on either side of the centerline 18 of the cab 42. In an alternative arrangement three projection devices 100 are used, with one centrally positioned and one positioned a distance on either side of the centerline 18 of the cab 42. Alternatively any other number of projection devices 100 are used, which are herein after referred to as projection device 100 regardless whether one or more projection devices 100 are used; that is the singular refers to the plural as well.

In this arrangement, projection device 100 projects light, laser light and/or images onto a reflection surface 102. Reflection surface 102 is any surface which reflects the guidance image 68, be it light, laser light, an image, a holographic image, or any combination, color, shape, style, size or combination thereof, back to the operator 44 to be seen or perceived by the operator 44. In one arrangement, reflection surface 102 is the interior surface of windshield 46. In this arrangement, the size, shape and design of the windshield is accounted for by the computing unit 54. That is, because the shape of the interior surface of windshield 46 affects the angle at which the image reflects, and causes distortion of the image, the computing unit 54 takes the size and shape thereof into account and directs the projection device 100 to project the guidance image 68 accordingly.

Alternatively, instead of using the windshield 46 as reflection surface 102, a reflection device 104 is placed within cab 42. Reflection device 104 is any device which receives and reflects guidance image 68 from projection device 100. In one arrangement, reflection device 104 is a pane or panel of transparent or translucent material positioned within cab 42 and placed in the operators line of sight or sight path, that is separate or apart from windshield 46. In the arrangement shown, reflection device 104 is placed at an angle to the windshield 46 and therefor provides the advantage of being adjustable in position, orientation and angle, whereas in contrast the position, orientation and angle of windshield 46 is generally fixed. The use of reflection device 104 also provides the advantage that if the reflection device 104 is not desired to be used, such as when no implement is attached to the vehicle 12, the reflection device 104 may be removed or folded away, or placed in a position that is not in the operator's line of sight. In addition, in one arrangement, an angle adjusting device is connected to reflection device 104 and controlled by computing unit 54. This angle adjusting device is any device which adjusts the angle of reflection device 104 such as a solenoid, a hydraulic device, a pneumatic device, a motor, or the like. The angle adjusting device adjusts the angle of the reflection device 104 as the computing unit 54 detects the position or orientation of the operator 44 changes. In this way, the angle adjusting device compensates for movement of the operator 44.

To improve reflection, display, appearance and/or resonation of the guidance image 68 in one arrangement a film 106 is placed on the windshield 46 or the reflection device 104. Film 106 is any film, layer or other coating or object that allows the operator 44 to see through the film 106 while enhancing the appearance of the projected guidance image 68. The film 106 can be placed on the interior side, exterior side or middle of the reflection device 104. In one arrangement, film 106 is a selectively permeable or a selectively transparent surface, coating or film that is transparent to the operator's vision and many forms of light, but reflects the light, laser light and/or images projected by projection device 100.

In an alternative arrangement, instead of reflecting guidance image 68 off of reflections surface 102, display unit 66 includes a transparent or translucent light emitting display 108. For the purposes of this application, the terms transparent and translucent mean one and the same thing which is to be able to see there through. While the transparent light emitting display 108 is transparent, allowing the operator 44 to see there through, it also emits light which is visible to the operator 44.

Therefore, transparent light emitting display 108 is any device which is both transparent and emits light on command. Examples of transparent light emitting displays 108 include transparent liquid crystal displays (TLCD), transparent light emitting diodes (TLED), transparent organic light emitting diodes (TOLED), and the like.

An organic light-emitting diode (OLED) is a light-emitting diode (LED) in which the emissive electroluminescent layer is a film of organic compound which emits light in response to an electric current. This layer of organic semiconductor is situated between two electrodes; typically, at least one of these electrodes is transparent. OLEDs are used to create digital displays in devices such as television screens, computer monitors, portable systems such as mobile phones, handheld game consoles and PDAs. A major area of research is the development of white OLED devices for use in solid-state lighting applications.

There are two main families of OLED: those based on small molecules and those employing polymers. Adding mobile ions to an OLED creates a light-emitting electrochemical cell (LEC) which has a slightly different mode of operation. OLED displays can use either passive-matrix (PMOLED) or active-matrix addressing schemes. Active-matrix OLEDs (AMOLED) require a thin-film transistor backplane to switch each individual pixel on or off, but allow for higher resolution and larger display sizes.

An OLED display works without a backlight; thus, it can display deep black levels and can be thinner and lighter than a liquid crystal display (LCD). In low ambient light conditions (such as a dark room), an OLED screen can achieve a higher contrast ratio than an LCD, regardless of whether the LCD uses cold cathode fluorescent lamps or an LED backlight.

Transparent organic light emitting diodes (TOLEDs) thus far are capable of 70% to 85% transparency when turned off, TOLED pixels are nearly as clear as the glass or plastic substrate on which they are built. When used in an active-matrix OLED configuration, the effective transmission of the TOLED may, however, be somewhat reduced depending on the display resolution of the display and TFT design. Typically, the light generated by the TOLED emits from both surfaces. Enhancement films and other optical treatments may be used to direct more of the light in one direction than the other. TOLEDs also offer excellent opto-electronic performance properties, i.e., spectral color emission, luminous efficiency and long lifetime.

When using a transparent light emitting display 108, the transparent light emitting display 108 may be directly connected to the interior surface of windshield 46 or formed as part of windshield 46. Alternatively, transparent light emitting display 108 may be a standalone unit, separate from windshield 46 and placed within cab 42.

The use of a transparent light emitting display 108 eliminates the need to project the guidance image 68 and reflect it to the operator 44. Instead, computing device 54 commands transparent light emitting display 108 to transmit the guidance image 68 when and where needed.

Tracking Unit:

As described herein, tracking unit 60 is any device which senses the position and orientation of the operator's head and/or eyes such as a sensor, a camera, a video camera, a laser sensor, infrared sensor, position sensor, an image sensor, a movement sensor, or any combination thereof. In one arrangement, tracking unit 60 is positioned in front of operator 44 and tracking unit 60 and operator 44 face one another. In the arrangement shown, tracking unit 60 is placed in the upper, forward, center portion of cab 42, however any other position is hereby contemplated.

Tracking unit 60 includes one or more 2D or 3D cameras that record images of the operator, and more specifically the operator's head and eyes. These images are then transmitted to computing unit 54 and the position and orientation of the operator's head and eyes are determined using software. That is, based upon visual recognition, a position factor and an orientation factor of the operator's head and eyes are determined. To provide greater accuracy, tracking unit 60 includes two or more cameras. When a single camera is used, the camera is placed in a generally centrally located position or centrally located to the position where the operator 44 is to sit. In the arrangement wherein two cameras are used, one camera is placed a distance outward from the centerline 18 of the vehicle 12 or the position where the operator 44 is to sit. In the arrangement wherein three cameras re used, one camera is placed in a generally centrally located position or the position where the operator 44 is to sit and one camera is placed a distance outward from the centerline 18 of the vehicle 12 or the position where the operator 44 is to sit. Using multiple cameras improves the accuracy of tracing the position and orientation of the operator's head or eyes, especially when the operator 44 turns their head or substantially moves their position because, as they turn away from one camera they inherently turn toward another camera. In addition, having multiple images, or multiple reference points, provides an error-check and further improves accuracy of tracking. In one arrangement, these cameras track images in black and white, whereas in another arrangement, these cameras also detect color, such as red, green, and blue, and uses this information for facial recognition.

In one arrangement, in addition to including one or more cameras, tracking unit 60 also includes a depth sensor that senses the depth of objects within its sensing range. This includes the environment of the cab 42 as well as the operator 44 positioned within the cab 42. As the operator 44 moves within the cab 42, the depth sensor sense the positon of the operator. In one arrangement, depth sensor uses laser light, infrared, or any other wavelength to detect depth without disturbing or interfering with operator 44.

In one arrangement, the images recorded from cameras and the depth information detected by the depth sensor are transmitted to computing unit 54 which detects and tracks various points on the operator's body, mapping them to a digital reproduction of the operator's body and skeletal structure, including facial details. These points may include the top of their head, the sides of their head, their ears, the center of their forehead, the end or their nose, the middle of their eyes, the outside of their eyes, the inside of their eyes, the center of their chin, the bottom of their chin, the center of their cheeks, their temples, the outside of their mouth, the center of their mouth, or any other point on their body. From this information, not only does the computing device 54 determine the position or positon factor of the operator 44 and/or the operator's head and/or the operator's eyes, but the computing device 54 determines the orientation or orientation factor of the operator 44 and/or the operator's head and/or the operator's eyes (wherein they are looking). From this information, the computing unit 54 calculates where and how to project the guidance image 68.

Drive Controls:

In one arrangement, drive controls 43 are connected to computing unit 54. That is, when the operator 44 steers, accelerates, decelerates or operates the vehicle 12 in any other manner, this information is transmitted to computing unit 54. The information from drive controls 53 is then used in association with the vehicle parameters and the implement parameters and all other information received by computing unit 54 to determine the position of the guidance, image 68. Transmitting drive control information to computing device 54 helps computing device 54 more-accurately determine the position of implement 14 in the future and therefore allows computing device 54 to more accurately display guidance image 68.

Implement GPS Unit:

In one arrangement, a GPS unit is attached to the implement 14 to provide the GPS position of the implement 14. In this arrangement, the implement GPS 110 is connected to the implement 14 and detects the positon of the implement 14 independent of the position detected by the GPS receiver 22 connected to the vehicle 12. Adding implement GPS 110 to the system 10 is especially helpful where the position of implement 14 varies greatly with respect to the position of vehicle 12, such as an articulating boom on a sprayer, a wide planter or large tillage device. When present, the information from implement GPS 110 is transmitted to computing unit 54 which considers this information when calculating the position of guidance image 68.

Depth Sensors:

In one arrangement, one or more depth sensors 112 are connected to system 10. Depth sensors 112 are any form of a sensor that senses the environment around and particularly in front of vehicle 12, such as laser sensors, infrared sensors, depth sensing cameras, or any other form of sensor. In the arrangement shown, depth sensors 112 sense the contours of the land in front of vehicle 12 and transmit this information to computing unit 54. Knowing the layout of the land in front of vehicle 12 is especially helpful to computing unit 54 as it allows computing unit 54 to calculate the location of guidance image 68 more accurately. That is, the position of guidance image 68 moves depending on the contours of the land in front of vehicle 12.

In Operation:

Computing unit 54 calculates the position of guidance image 68 based on all the inputs to computing unit 54. That is, as the vehicle 12 is steered by operator 44 using drive controls 43, computing unit 54, using the vehicle parameters (such as width and length and the like) and implement parameters (such as width and length and the like) receives the information from drive controls 43 and calculates the expected position of the implement 14 in the future. In the arrangement wherein implement GPS 110 is used, the computing unit 54 further considers the sensed position of the implement 14 from the implement GPS 110 which may vary from the calculated positon of implement 14 for countless reasons.

When calculating where the guidance image 68 should be displayed, the computing unit 54 calculates the position of guidance image based on the position factor of the operator 44 and the orientation factor of the operator 44 received from the tracking unit 60. In addition, in an arrangement wherein depth sensors 112 are used, computing unit 54 further considers the variation in the land ahead of vehicle 12 and adjusts the position of the guidance image 68 accordingly. The computing unit 54 further considers the position and size and shape of the display unit 66 and adjusts the positon of the guidance image 68 accordingly so that the guidance image 68 appears in the appropriate spot for the operator 44.

As the operator 44 moves their position within cab 42 (position factor) or changes where they are looking (orientation factor) the computing unit 54 receives this information from tracking unit 60 and adjusts the position of guidance image 68 accordingly. This process repeats, over and over, up to several times per second, even several thousand times per second, resulting in an accurate display of the guidance image 68 for the operator 44 regardless of the movement of the operator's location within cab 42 and regardless of where the operator 44 is looking (within predetermined extremes).

The accurate projection of the guidance image 68 does not encumber or inhibit the operator 44 in any way. The guidance image 68 provides a passive double-check for the operator 44 in a convenient manner. This guidance image 68 makes it easier for the operator 44 to control the vehicle 12 and implement 14 in an accurate manner and reduces the stress and fatigue on the operator 44.

Figure 8:
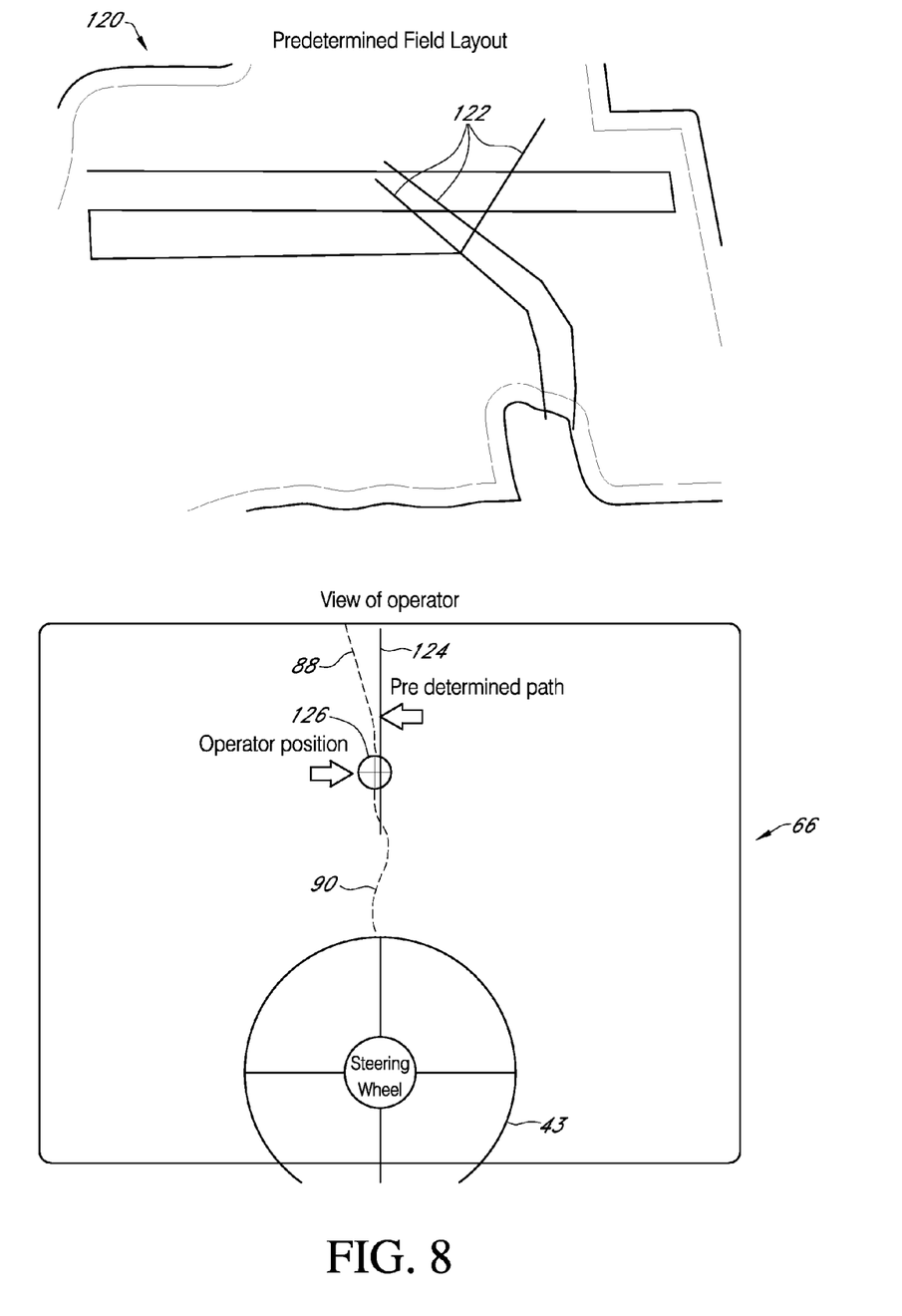
FIG. 8 is an elevation view of an exemplary field with mapped information thereon, and an exemplary view from a vehicle showing the mapped information projected for the operator to view.

Projection of Mapping Information:

As a particular manner of use, the system 10 described herein is used in association with mapping or mapped information which is displayed by display unit 66. As one example, a user maps onto a field 120 a desired position for tile line 122 using field mapping software such as John Deere®'s GreenStar™ system, Ag Leader®'s SMS™ system, Trimble®'s Connected Farm™ system, Case IH's AFS system, or the like system. Next, the user uploads the mapped information to the system 10, or specifically to computing unit 54.

Computing unit 54 determines the position of vehicle 10 based on location information from GPS receiver 22 and/or implement GPS 110 and compares the location of the displays the desired position of tile line 122 with the position of the vehicle 12/implement 14. Next, the system 10 determines the position information and orientation information of the operator 44 within cab 42. Based on this information, computing unit 54 computes the desired position 124 of tile line 122 and displays this desired position 124 using display unit 66. Simultaneously, based on these inputs, and all other inputs to computing unit 54, computing unit 54 calculates the actual or current position 126 of vehicle 12 and/or implement 14 and displays this actual or current position 126 using display unit 66. As such, the display unit 66 displays both the desired position 124 of tile line 122 as well as the actual or current position 126 of the tile line 122 based on the current location of the vehicle 12 and implement 14 and the current trajectory, speed and other variables inputted to computing device 54.

As the position, direction or orientation of the vehicle 12 and/or implement 14 changes or is adjusted, the actual or current position 126 of tile line 122 is simultaneously adjusted by computing unit 54 to show the new actual or current position 126 of tile line 122. Similarly, as the operator 44 changes their position or orientation within the cab 42, the computing unit 54 adjusts the position of the desired position 124 and actual or current position 126 of the tile line 122. In addition, in one arrangement, the computing unit 54 also displays the leading line 88 and the trailing line 90 used in association with the actual or current position 126, as is described herein.

In this way, the system 10, and more specifically the display 66, visually shows the operator 44 where their desired position 124 of tile line 122 is while simultaneously displaying the actual or current position 126 of tile line based upon the current position, direction and orientation of vehicle 12 and implement 14. This allows the operator 44 to have instantaneous feedback comparing the actually installed position of tile line 122 and the desired position 124 of tile line 122.

The actually installed positon of tile line 122 is then recorded and is then added to the permanent map or record of field 120 for later use and display. As one example, when planting, tilling, spraying, or harvesting field 120, computing unit 54 retrieves the actually installed location of tile line 122 and displays the location of tile line 122 on display unit 66 during these operations. This information is helpful as it makes operators 44 aware of the location of the buried tile line 122 so as to improve their ability to spot issues related to the tile line such as blowouts, cracks, exposed tile, or any other issue and it helps operators avoid driving directly over or directly on the tile line or tilling, digging too deeply in the location of the tile line 122.

While a tile line 122 is specifically used in this example, it is simply that an example. It is hereby contemplated that other object, device, structure or the like can be mapped and displayed in the manner described herein with reference to tile line 122, such as mapped combine, tillage, spraying or planting passes, fence lines, field borders, drains, buried rocks or stony knolls, irrigation equipment or paths, dikes or berms, erosion ditches, soft spots, wet spots, hard spots, creeks, water ways, or any other object or feature.

Figure 9:
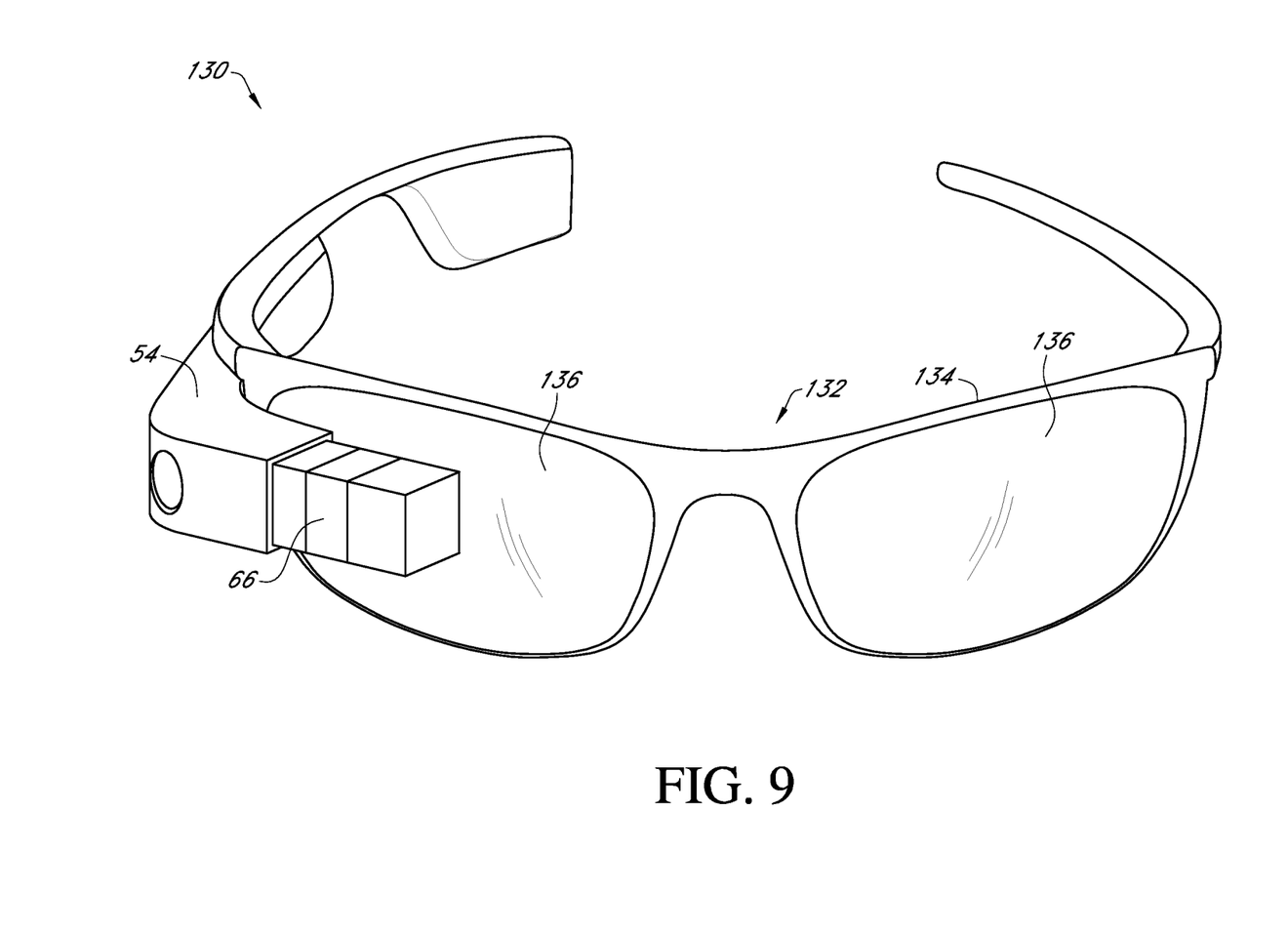
FIG. 9 is a perspective view of a wearable unit associated with the system.

Wearable System:

In one arrangement, the system 10 described herein is used in association with a wearable unit 130. Wearable unit 130 is formed of any suitable size, shape and design and serves as a wearable device that displays the information and images as is described herein. In one arrangement, wearable unit 130 is formed of a pair or eye glasses 132 similar to that known as Google Glass™.

In the arrangement shown, wearable device 130 is formed of a pair of eye glasses 132 having a frame 134 and a pair of lenses 136 which are held by frame 134 through which the operator 44 looks or views. Display unit 66 is connected to or positioned in front of one or both lenses 136 in the operator's sight path. Display unit 66 displays the guidance image 68 onto, into or through lens 136 which is then viewed or perceived by operator 44 including the point 80, cross hairs 82, circle 84, leading line 88, trailing line 90, tile line 122 (or any other mapped feature or object) or any combination thereof.

In one arrangement, computing unit 54 is also attached to frame 134 and/or display unit 66 and wirelessly communicates with the other components of system 10 such as GPS receiver 22, implement GPS 110, drive controls 43, depth sensors 112 or any other component. In an alternative arrangement, so as to save space and weight on wearable unit 130 a portion of computing unit 54 is attached to frame 134 and/or display unit 66 whereas other portions of computing unit 54 are connected to vehicle 12, cab 42 or any combination thereof and the separated portions of computing unit 54 communicate by wireless communication such as Wi-Fi, Bluetooth or the like communicating protocols. By separating the computing unit 54 and the computing functions, this reduces the required componentry in the wearable unit 130 thereby making the wearable unit 130 lighter and/or smaller and more comfortable to wear.

In one arrangement, because the lenses 136 and/or display unit 66 are so closely positioned in front of the operator's eyes, a tracking unit 60 is not used to track the operators eye position and instead the display images 68 are displayed based upon the assumption that the operator 44 is looking straight forward through the lenses 136 and/or display unit 66 and/or display image 68. In an alternative arrangement, the tacking unit 60 as is described herein that is connected with the vehicle 12 and/or cab 42 is still used in the manner described herein. That is, the tracking unit 60 is positioned within the cab 42 and detects the position and orientation of the operator's head and eyes and transmits the position and orientation information to the computing unit 54 which is either wholly or partially connected to the vehicle 12 and/or cab 42 and/or wholly or partially connected to the wearable unit 130. From this position and orientation information, the computing unit 54 determines the appropriate placement for guidance image 68.

In an alternative arrangement, wearable unit 130 includes tracking unit 60 therein. That is, tracking unit 60 is formed as a part of wearable unit 130 and tracks the position and orientation of the operator's head and/or eyes. In one arrangement, the wearable unit 130 includes its own GPS device which provides the GPS position of the wearable unit 130 or the operator's head, as well as a system for tracking the eye movement, orientation or where the operator 44 is looking, such as the systems described herein such as cameras or the like. This position and orientation information is then transmitted to computing unit 54 and the position of guidance image 68 is then calculated from this position and orientation information.

Using wearable unit 130 in association with or as part of system 10 provides the operator 44 with more freedom and less encumbrances as it allows the operator 44 to look in any direction while maintaining the same view upon the display unit 66, among countless other advantages. In addition, use of wearable unit 130 in association with or as part of system 10 provides greater accuracy in some applications and instances.

From the above discussion it will be appreciated that the visual guidance system shown and described herein improves upon the state of the art.

Specifically, the visual guidance system presented herein: helps provide an operator with a point of reference to help guide the vehicle and implement; easy to use; can serve as a back-up or double check to GPS guidance systems; does not require GPS; the visual guidance system predicts the position of an outside edge of an implement in the direction of travel thereby providing a reference point for steering; is inexpensive; is adjustable; adjusts for the position of an operator's head; is robust; can be easily seen; is simple and does not distract the operator; can be adjusted for various implements and applications; is robust and durable; can be used in a wide variety of applications; reduces collisions with the implement; reduces overlap between passes; maximizes the amount of ground covered; improves operator efficiency; reduces strain on an operator; makes the vehicle easier to control and improves safety, among countless other features and advantages. Thus, one of ordinary skill in the art would easily recognize that all of the stated objectives have been accomplished.

It will be appreciated by those skilled in the art that other various modifications could be made to the device without parting from the spirit and scope of this invention. All such modifications and changes fall within the scope of the claims and are intended to be covered thereby.

What is claimed:

1. A visual guidance system, comprising:
   a vehicle, the vehicle having vehicle parameters,
   an implement connected to the vehicle, the implement having implement parameters;
   a cab connected to the vehicle, the cab having an open interior;
   drive controls positioned within the cab;
   an operator positioned within the cab within operating distance of the drive controls;
   a tracking unit positioned within the cab;
   a display unit positioned within the cab, the display unit operatively connected to the tracking unit;
   a computing unit, the computing unit operatively connected to the tracking unit and the display unit;
   wherein the tracking unit tracks a position factor and an orientation factor of the operator's head;
   wherein the computing unit calculates a position of a guidance image from the vehicle parameters, the implement parameters, and the position factor and orientation factor of the operator's head; and
   wherein the display unit displays the guidance image in a forward sight path of the operator thereby aiding in the guidance of the vehicle and implement.

2. The visual guidance system of claim 1, wherein the display unit projects light, laser light, an image, or a combination thereof, off of a reflective surface.

3. The visual guidance system of claim 1, wherein the display unit projects light, laser light, or a combination thereof off of a reflection device.

4. The visual guidance system of claim 1, wherein the display unit projects light, laser light, or a combination thereof off of a reflective film.

5. The visual guidance system of claim 1, wherein vehicle parameters include a width of the vehicle and a length of the vehicle.

6. The visual guidance system of claim 1, wherein implement parameters include a width of the implement and a length of the implement.

7. The visual guidance system of claim 1, wherein the visual guidance system of claim 1, wherein implement parameters include a position of the implement relative to the vehicle.

8. The visual guidance system of claim 1, wherein the computing unit further calculates the position of the guidance image from speed information and direction information.

9. The visual guidance system of claim 1, wherein the display unit includes a transparent light emitting display.

10. The visual guidance system of claim 1, wherein the display unit is selected from the group consisting of a transparent liquid crystal displays (TLCD), transparent light emitting diodes (TLED), and transparent organic light emitting diodes (TOLED).

11. The visual guidance system of claim 1, wherein the implement selected from the group consisting of: plowing device, a planting device, a harvesting device, a bailing device, a mowing device, a tilling device, a cultivating device, a spraying device, a spreading device, a trailer, a paving device, a sweeping device, grating device, a compaction device and a painting device, earthmoving device.

12. The visual guidance system of claim 1, wherein the tracking unit tracks the orientation of the operator's eyes.

13. The visual guidance system of claim 1, wherein the guidance image moves as the position of the operator's head moves.

14. The visual guidance system of claim 1, wherein the guidance image moves as the orientation of the operator's eyes move.

15. The visual guidance system of claim 1, wherein the guidance image represents a predetermined position of the implement.

16. The visual guidance system of claim 1, wherein the computing unit accounts for the shape of an interior surface of a windshield.

17. The visual guidance system of claim 1, further comprising a guidance image projected on a rear display.

18. The visual guidance system of claim 1, wherein the guidance image includes a leading line.

19. A visual guidance system, comprising:
   a vehicle, the vehicle having vehicle parameters;
   an implement connected to the vehicle, the implement having implement parameters;
   a cab connected to the vehicle, the cab having an open interior;
   drive controls positioned within the cab;
   an operator positioned within the cab within operating distance of the drive controls;
   a tracking unit positioned within the cab;
   a display unit positioned within the cab, the display unit operatively connected to the tracking unit;
   a computing unit, the computing unit operatively connected to the tracking unit and the display unit;
   wherein the tracking unit tracks a position factor and an orientation factor of the operator's head;
   wherein the computing unit calculates a position of a guidance image from the vehicle parameters, the implement parameters, and the position factor and orientation factor of the operator's head;
   wherein the display unit displays the guidance image in a forward sight path of the operator thereby aiding in the guidance of the vehicle and implement; and
   wherein the display unit is a transparent light emitting device such as transparent light emitting diodes or one or more transparent liquid crystal displays.

20. A visual guidance system, comprising:
   a vehicle;
   an implement, the implement connected to the vehicle, the implement having implement parameters;
   a cab, the cab connected to the vehicle;
   a tracking unit;
   a display unit;
   a computing unit;
   wherein the tracking unit, the display unit and the computing unit are operatively connected to one another;

wherein the tracking unit simultaneously tracks a position factor and an orientation factor of an operator's head;

wherein the computing unit calculates a position of a guidance image based upon the position factor and orientation factor of the operator's head and the implement parameters;

wherein the display unit displays a guidance image in view of the operator; and wherein the guidance image represents a predetermined position of the implement.

* * * * *